Patented Dec. 22, 1942

2,306,281

UNITED STATES PATENT OFFICE 2,306,281

PROCESS OF MAKING FATTY OIL PRODUCTS

John B. Rust, West Orange, N. J., assignor to Ellis-Foster Company, a corporation of New Jersey No Drawing. Application September 12, 1938, Serial No. 229,529

5 Claims. (Cl. 260—341)

The present invention relates to the modification of varnish materials including unsaturated glyceride oils and natural resins and the process of making said modifications. More particularly it relates to the catalytic combination of said varnish materials with compounds, particularly acids, possessing the structure —C=C—CO such as maleic anhydride, the catalyst being an acid stronger than maleic acid.

It is known that $\alpha,\beta$-unsaturated acids such as maleic anhydride, citraconic anhydride, itaconic anhydride, fumaric acid, and so forth, react directly with conjugated unsaturated systems such as are possessed by butadiene, cyclopentadiene, $\alpha$-terpinene, and so forth. Also certain varnish materials including the strongly drying oils such as tung oil and oiticica oil and rosin have such conjugated systems and readily react with maleic anhydride or its equivalents. However, other oils and natural resins which do not contain conjugated double bonds do not react directly. For example, in reacting tung oil with maleic anhydride the two constituents are mixed together without any catalyst and heated up to about 200° C. Further heating is carried out as desired and a slightly thickened material results which is soluble in aqueous ammonia to a degree depending upon the amount of combined maleic anhydride. Saponification of the tung oil-maleic adduct yields acids whose acid number is considerably higher than that of tung oil acid indicating that a non-saponifiable carbon-to-carbon linkage of the maleic anhydride with the oil is obtained.

It has now been found that such products may be obtained by reacting maleic anhydride or its equivalents with unsaturated glyceride oils and natural resins of various types in the presence of strong acid catalysts such as p-toluenesulphonyl chloride, toluenesulphonic acid, sulphuric acid, sulphamic acid, oxalic acid, and the like, or, in general, with any acid of greater strength than maleic acid. That is, the group of varnish materials capable of reacting according to the present invention include those known to contain no conjugated systems and hence not expected to undergo the Diels-Alder reaction, the term used to designate the general reaction of conjugated poly-enes with maleic anhydride or material possessing structures —C=C—C=O. Furthermore by the catalytic method of the present invention better combination of maleic anhydride or its equivalents with drying oils containing conjugated systems is secured as is indicated by the acid number of the saponified product and the solubility of the reaction product in aqueous ammonia.

Essentially the process of the present invention comprises reacting in a heated system equipped as desired with reflux apparatus, or in an autoclave, an unsaturated fatty oil or oil acid, or an unsaturated natural resin, not necessarily containing conjugated linkages, with maleic anhydride, its derivatives or equivalents in the presence of a catalytic amount of an acid stronger than maleic acid. The strength of acid is generally determined by ionization constant. The degree of reaction may be controlled by the temperature of reaction which may vary from about 60° C. to over 200° C. and by the reaction time.

The invention may be better illustrated by the following examples in which proportions are in parts by weight.

*Example 1.*—160 parts of raw linseed oil were heated under a reflux condenser with 62 parts of maleic anhydride in the presence of 2.5 parts of p-toluenesulphonyl chloride at about 200° C. for two hours. During the first part of the reaction rather violent boiling occurred which diminished with a rise in temperature as reaction progressed. A soft, sticky solid was obtained which was soluble in ammonia water. The solution could be diluted indefinitely with water without clouding.

The acid number of such a material is about 215 and that of the acids obtained by saponification of the reaction product is 324.

*Example 2.*—160 parts of raw linseed oil were heated under a reflux condenser at about 200° C. with 62 parts of maleic anhydride in the presence of 2.5 parts of p-toluenesulphonic acid for two hours. A soft, sticky solid was obtained when cooled to room temperature which had an acid number of 193 and was soluble in 28% aqueous ammonia water. The solution could be diluted indefinitely without precipitating the reaction product.

*Example 3.*—160 parts of raw linseed oil were heated at 200° C. with 62 parts of maleic anhydride under a reflux condenser in the presence of 2.5 parts of pyrophosphoric acid for two hours. A soft, sticky light-colored solid was obtained having an acid number of 201 and soluble in aqueous ammonia water.

*Example 4.*—160 parts of raw linseed oil were heated at 200° C. under a reflux condenser for two hours with 62 parts of maleic anhydride in the presence of 2.5 parts of 66° Baumé sulphuric acid. A light-colored soft solid was obtained which had an acid number of 212 and was soluble in 28% aqueous ammonia water.

*Example 5.*—A series of drying and semi-drying oils was reacted with maleic anhydride as follows: 160 parts of raw fatty oil were heated with 62 parts of maleic anhydride under a reflux condenser at 200° C. for 2 hours in the presence of 2.5 parts of p-toluenesulphonic acid. The reaction products were saponified by boiling with aqueous caustic soda, neutralized with acetic acid, carefully washed and dehydrated. As a control the raw oils were saponified, neutralized, washed and dehydrated in the same manner. The acid numbers of the oil acids and reaction products' acids along with the acid number of the reaction products are given below.

| No. | Fatty oil | Acid number of reaction product | Acid number of acids from Hydrolyzed reaction products | Acid number of fatty oil acids |
|---|---|---|---|---|
| 1 | Tung oil | 170 | 394 | 227 |
| 2 | Linseed oil | 193 | 324 | 215 |
| 3 | Perilla oil | 179 | 300 | 205 |
| 4 | Soya bean oil | 175 | 311 | 293 |
| 5 | Cottonseed oil | 165 | 293 | 200 |

The above table illustrates clearly the extent of reaction which occurs under the conditions obtaining in the experiment.

Since it is known that tung oil reacts with maleic anhydride, the following experiment illustrates that a more complete reaction is obtainable by the catalytic method of the present invention.

*Example 6.*—160 parts of raw tung oil were heated in an open container with 62 parts of maleic anhydride at gradually increasing temperatures for about 2 hours. The final temperature was 285° C. to insure complete reaction. The resulting product was saponified by boiling with aqueous sodium hydroxide, neutralized, washed and dehydrated. The acids had an acid number of 284. Comparing this with the tung oil reaction product of Example 5 (1) it will be seen that less reaction occurred in the present case than when a catalyst was employed, as is indicated by the acid number of the fatty acids.

It will be noted that of the oils in the foregoing examples cottonseed and sunflower seed oil are in the semi-drying oil class and linseed, soya bean, perilla and tung oil are in the drying oil class. Other illustrative semi-drying oils are corn oil and sesame oil. Oiticica oil is similar to tung oil in its drying properties. The following example illustrates the maleic combinations with the last named series of fatty oils in the presence of toluenesulphonic acid as a catalyst.

*Example 7.*—160 parts of fatty oil and 62 parts of maleic anhydride were heated together at about 200° C. under a reflux condenser for two hours in the presence of 2.5 parts of p-toluenesulphonic acid. The following results were obtained with the oils employed.

| No. | Drying oil | Acid number of reaction product | Physical appearance |
|---|---|---|---|
| 1 | Oiticica oil | 187 | Hard sticky solid. |
| 2 | Corn oil | 142 | Viscous oil. |
| 3 | Sesame oil | 151 | Soft sticky solid. |

The present invention is not limited to the use of vegetable oils, but unsaturated fatty oil acids may be employed as well as certain unsaturated animal oils such as menhaden oil. The following examples illustrate the use of such materials.

*Example 8.*—160 parts of menhaden oil were heated under a reflux condenser at 200° C. for two hours with 62 parts of maleic anhydride in the presence of 2.5 parts of p-toluenesulphonic acid. A soft sticky solid was obtained having an acid number of 156 and which was soluble in 28% ammonia water. The solution could be diluted indefinitely without clouding.

*Example 9.*—160 parts of linseed oil acids and 62 parts of maleic anhydride were heated under a reflux condenser at 200° C. for 2 hours with 2.5 parts of p-toluenesulphonic acid. A very viscous liquid having an acid number of 322 was obtained.

All of the fatty oils and oil acids of the foregoing examples have some proportion of long chain acids containing a plurality of double bonds in the same radical. It has now been unexpectedly found, however, that acids containing only one double bond will react with $\alpha, \beta$-enal structures using the acid catalysts of the present invention.

*Example 10.*—284.4 parts of C. P. oleic acid were heated with 70.6 parts of maleic anhydride and 3 parts of p-toluenesulphonyl chloride under a reflux condenser at 200° C. for 3 hours. A light colored, viscous oil was obtained which was washed with water to remove excess maleic anhydride until the wash water was neutral to litmus paper. The washed and dehydrated reaction product had an acid number of 306.2 compared with 198 for oleic acid, indicating that a substantial reaction had occurred.

The process of the present invention is not limited to the use of fatty oils or derivatives, but may also be applied to the natural resins or resin acids containing unsaturated linkages, such as copal, dammar, and the like.

*Example 11.*—3 parts of run Congo copal were heated under a reflux condenser with 1 part of maleic anhydride and 0.075 part of p-toluenesulphonyl chloride for 3 to 4 hours. A hard, brittle resin was obtained which was boiled with aqueous sodium hydroxide, neutralized, washed and dehydrated. The material had an acid number of 180 compared with run Congo copal given the same saponification treatment and having an acid number of 67.

*Example 12.*—100 parts WW rosin were heated with 25 parts of maleic anhydride and 2.5 parts of p-toluenesulphonyl chloride for two hours at 220° C. under a reflux condenser. The resulting material was somewhat darker than WW rosin and was readily soluble in ammonia water to produce a non-viscous solution. It had a softening point of 134° C., and an acid number of 281.3.

The above examples have used maleic anhydride, but other compounds containing the group —C=C—CO may be employed.

*Example 13.*—100 parts of linseed oil were heated under a reflux condenser with 30 parts of fumaric acid in the presence of 2 parts of p-toluenesulphonyl chloride at 200° C. for several hours. A soft sticky solid was obtained which was readily soluble in aqueous ammonium hydroxide and had an acid number of 185.7.

*Example 14.*—21.2 parts of diethyl fumarate were heated under a reflux condenser at 200° C. with 37 parts of linseed oil in the presence of 2.5 parts of p-toluenesulphonyl chloride. During the first part of the reaction the solution boiled violently, but quieted rapidly and the temperature was raised to 240° C. with very little boiling. Finally the temperature was raised to 250° C. when the solution had been refluxed for a total time of one hour. No boiling occurred indicating a substantially complete reaction. At room temperature the product was a viscous oil. It had an acid number of 66, indicating a partial hydrolysis of the ester but was not soluble in ammonia water. If diethyl maleate was substituted for the diethyl fumarate used above similar results were observed.

The proportion of maleic anhydride to other reactants is not limited but may be varied at will to give products of different characteristics.

*Example 15.*—In this example the following heating schedule was used: the materials were heated under a reflux condenser up to 200° C. in one hour, held at 200° C. for two hours, then at 250° C. for 2 hours.

|   | Parts of linseed oil | Parts of maleic anhydride | Parts of p-toluene-sulphonic acid | Acid number of reaction product |
|---|---|---|---|---|
| 1 | 200 | 10 | 2.2 | 64.4 |
| 2 | 200 | 25 | 2.2 | 96.8 |
| 3 | 200 | 40 | 2.2 | 105.6 |
| 4 | 200 | 55 | 2.2 | 113.7 |

The products of the present invention may be used for a variety of purposes. They may be dissolved in ammonia water to serve as water paints or distempers, or as wetting or emulsifying agents. As polybasic acids they may be reacted with polyhydric alcohols to give thickened products useful in varnishes, printing ink, linoleum, factice and the like. For instance, the product of Example 1 can be esterified with glycerol to form a solid gel. This gel may then be dispersed in ammonia water to form a thick solution useful as a concrete paint, and so forth.

What I claim is:

1. The process of heating linseed oil having no conjugated unsaturated groups with maleic anhydride in the presence of an acid selected from the group consisting of p-toluene sulphonyl chloride, toluenesulphonic acid, sulphuric acid, sulphamic acid, oxalic acid, and pyrophosphoric acid as a catalyst under non-resinifying conditions the degree of reaction being controlled to yield soft, sticky solids by correlation of reaction time with the temperature of reaction to produce a reaction product capable of being esterified.

2. The process of reacting linseed oil having no conjugated unsaturated groups with maleic anhydride in the presence of an aromatic sulphonic acid under non-resinifying conditions the degree of reaction being controlled to yield soft, sticky solids by correlation of reaction time with the temperature of reaction to produce a reaction product capable of being esterified.

3. The process of heating linseed oil having no conjugated unsaturated groups with maleic anhydride in the presence of an aromatic sulphonic acid to temperatures of approximately 200° C. under non-resinifying conditions the degree of reaction being controlled to yield soft, sticky solids by correlation of reaction time with the temperature of reaction to produce a reaction product capable of being esterified.

4. The process of heating an unsaturated fatty oil component having no conjugated unsaturated groups with a compound possessing the structure —C=C—C=O in the presence of a catalytic amount of an acid selected from the group consisting of p-toluene sulphonyl chloride, toluenesulphonic acid, sulphuric acid, sulphamic acid, oxalic acid, and pyrophosphoric acid as a catalyst under non-esterifying conditions the degree of reaction being controlled to yield soft, sticky solids by correlation of reaction time with the temperature of reaction to produce a reaction product capable of being esterified.

5. The process of heating an unsaturated fatty oil acid component having no conjugated unsaturated groups with a compound possessing the structure —C=C—C=O in the presence of a catalytic amount of an acid selected from the group consisting of p-toluene sulphonyl chloride, toluenesulphonic acid, sulphuric acid, sulphamic acid, oxalic acid, and pyrophosphoric acid as a catalyst under non-esterifying conditions the degree of reaction being controlled to yield soft, sticky solids by correlation of reaction time with the temperature of reaction to produce a reaction product capable of being esterified.

JOHN B. RUST.